May 24, 1960 H. C. MAY 2,937,906
LOCOMOTIVE BRAKE EQUIPMENT EMBODYING QUICK RELEASE
AND DYNAMIC BRAKE INTERLOCK FEATURES
Filed Oct. 30, 1957
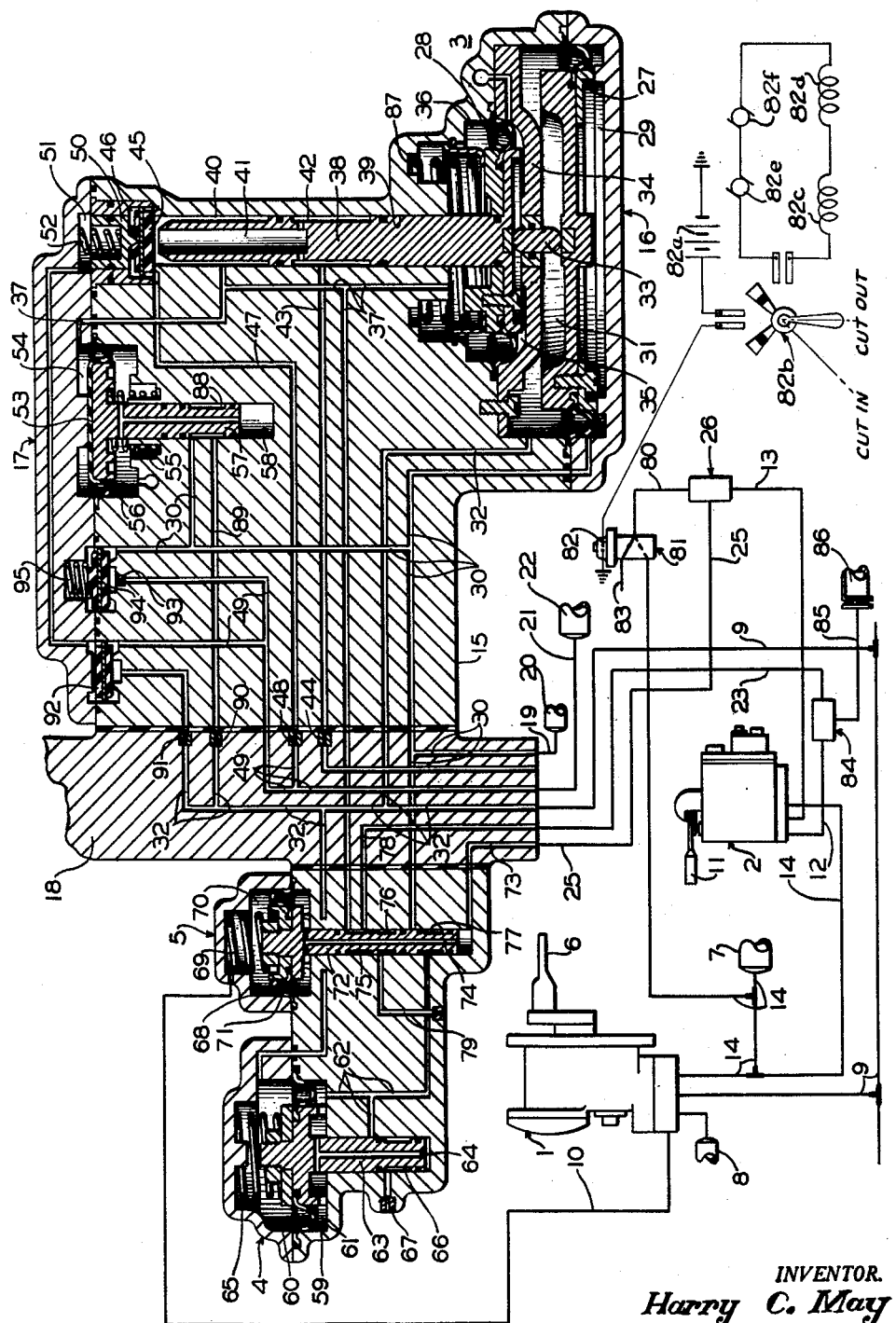
INVENTOR.
Harry C. May
BY
Adelbert A. Steinmiller
Attorney : 2,937,906
Patented May 24, 1960

2,937,906

LOCOMOTIVE BRAKE EQUIPMENT EMBODYING QUICK RELEASE AND DYNAMIC BRAKE INTERLOCK FEATURES

Harry C. May, East McKeesport, Pa., assignor to Westinghouse Air Brake Company, Wilmerding, Pa., a corporation of Pennsylvania Filed Oct. 30, 1957, Ser. No. 693,436

11 Claims. (Cl. 303—3)

This invention relates to locomotive brake equipment especially adapted for use on diesel-electric or electric locomotives, and more particularly for use on such locomotives that are provided with dynamic brakes and have brake controlling valves of the graduated application and graduated release type which operate to normally control application and release of the automatic brakes on the locomotive in unison with those on the connected cars and according to the degree of reduction and restoration, respectively, in the pressure of fluid in the brake pipe relative to the pressure of fluid normally bottled up in a control reservoir at a pressure substantially equal to the normal charge value of brake pipe pressure.

According to the present invention, there is provided an improved locomotive brake equipment having an interlock valve device comprising a quick release valve which is controlled by brake pipe pressure and a light spring bias opposing pressure of fluid in a chamber and normally positioned for cutting off said chamber from an atmospheric vent choke, and also comprising a selector valve which is normally biased to a position for permitting the brake controlling valve to control brake cylinder pressure so that locomotive brakes will normally be controlled automatically in unison with those on the connected cars. Upon either cut-in of dynamic brakes or operation of an independent brake valve device to effect an independent complete release of locomotive brakes, the selector valve will be fluid pressure actuated to a release position in which it cuts off the brake cylinder from the brake controlling valve, connects the brake cylinder to an exhaust choke for completely releasing the pneumatic brakes on the locomotive if an independent application and release pipe is then vented by the independent brake valve device or controlling brakes according to the selectable pressure provided in said application and release pipe, and connects the control reservoir to the aforementioned chamber of the quick release valve for causing the latter to operate to connect said chamber to said vent choke for reducing control reservoir pressure to substantially the value of brake pipe pressure. Thus, if an automatic brake application is then in effect on the connected cars, control reservoir pressure in the brake controlling valve on the locomotive will be reduced to the reduced value of brake pipe pressure; and if while the dynamic brakes are cut in or the independent brake valve device is in position for effecting a complete direct release of locomotive brakes, brake pipe pressure is further reduced for effecting an automatic brake application of increased degree on the connected cars, control reservoir pressure will be reduced to the same degree as brake pipe pressure. Since the brake controlling valve on the locomotive operates to apply brakes according to the differential between control reservoir pressure and brake pipe pressure, it will be apparent that by thus reducing control reservoir pressure with brake pipe pressure, locomotive brakes will not reapply when in response to a release of dynamic brakes or actuation of the independent brake valve device out of its direct release-effecting position, the selector valve returns to its normal position, in which it reconnects the brake cylinder to the brake controlling valve; in other words, the locomotive brakes will remain fully released. However, if brake pipe pressure is reduced after the selector valve returns to its normal position and cuts off the control reservoir from the quick release valve, locomotive brakes will be automatically applied to a degree corresponding to the extent of reduction in brake pipe pressure below the then reduced value of control reservoir pressure. Of course, if it is desired to apply locomotive brakes independently to any degree (greater or less than that then in effect on the cars) this may be done at any time by appropriate actuation of the independent brake valve device.

Thus, the locomotive brake equipment embodying the invention provides, for a graduated application and graduated release type locomotive brake controlling valve, a form of locomotive brake control which was heretofore provided only for combined automatic and electro-pneumatic straight-air locomotive brake equipment that operates to control locomotive brakes in a different manner and on an entirely different principle.

In the accompanying drawing, the single figure is a diagrammatic view of a locomotive brake equipment embodying the invention.

Description

As shown in the drawing, the locomotive brake equipment embodying the invention comprises an automatic brake valve device 1 for permitting brakes on the locomotive to be controlled automatically in unison with those on the connected cars of the train; an independent brake valve device 2 for permitting brakes on the locomotive to be controlled independently of those on the connected cars; a brake controlling valve device 3 for controlling brakes on the locomotive; and an interlock valve device comprising a quick release valve device 4 and a selector valve device 5 which is automatically operated upon the occurrence of either of two conditions hereinafter to be described to cause operation of said quick release valve device.

The automatic brake valve device 1 may, for the sake of illustration, be of the type fully disclosed in Fig. 1 of my copending application, U.S. Serial No. 588,036, now Patent No. 2,905,507, filed May 29, 1956, and assigned to the assignee of the present invention. This brake valve device comprises control valve means (not shown) responsive to movement of a handle 6 to a slow release position to connect a main reservoir 7 to an equalizing reservoir 8 for charging the latter to a preselected normal charge value of brake pipe pressure, responsive to movement of said handle to a service position to effect a full service reduction in equalizing reservoir pressure, and responsive to movement of said handle to any selected position within an application zone, defined between slow release and service positions, to provide in the equalizing reservoir fluid at a selectable pressure corresponding to the position of said handle in said zone, for causing a graduated application or a graduated release of brakes according to whether said handle is moved in the direction of said service position or in the reverse direction.

This valve device also comprises the usual relay valve or equalizing valve means (not shown) operative to vary pressure of fluid in a brake pipe 9 in accordance with the operator-controlled variations in equalizing reservoir pressure, for normally controlling brakes on the locomotive and cars according to the value of brake pipe pressure. When handle 6 is moved to a fast or full release position, a suppression valve means (not shown) which normally vents a certain passage is actuated to supply air from the main reservoir 7 to said certain passage for causing a quick release valve to supply air to the equalizing reservoir 8 in bypass of the control valve means for rapidly increasing equalizing reservoir pressure and thus causing the relay valve means to effect a rapid increase in brake pipe pressure, for, in turn, causing brake controlling valves on the locomotive and cars to effect a full release of brakes on the locomotive and cars.

According to a feature of the invention, a branch of the aforementioned certain passage (which corresponds to passage 109 of Fig. 1 of my above-identified copending application) is connected to a pipe 10, with the result that said pipe is normally vented but is charged with fluid at main reservoir pressure whenever the brake valve handle 6 is moved to fast release position. If, however, it is preferred to use a brake valve device having a release position, a running position, a service position and a lap position, suitable porting connections could be provided for causing main reservoir air to be supplied to pipe 10 only in release position of said brake valve device.

The independent brake valve device 2 may be of the type fully disclosed in U.S. Patent 2,548,674, granted April 10, 1951, to G. T. McClure et al., and assigned to the assignee of the present invention. This valve device comprises, briefly, self-lapping valve means (not shown) operable by movement of a handle 11 to a normal or release position to open both an independent application and release pipe 12 and an actuating pipe 13 to atmosphere, and operable by arcuate movement of said handle in a horizontal plane from release position into an application zone for maintaining the actuating pipe 13 vented while supplying fluid from a pipe 14 leading to the main reservoir 7 to the independent application and release pipe 12 at a pressure proportional to the extent of such movement; said valve device also comprising valve means (not shown) operable by depressing said handle against a spring bias while it is in release position or in the application zone to supply main reservoir air from main reservoir pipe 14 to the actuating pipe 13.

The brake controlling valve device 3 preferably comprises a sectionalized casing 15 that contains a service valve device 16 and a charging valve device 17 and is mounted on a pipe bracket 18 to which are connected a branch of the brake pipe 9, a pipe 19 leading to a control reservoir 20, a pipe 21 leading to a supply reservoir 22, a pipe 23, and a pipe 25 leading to a double check valve device 26.

The service valve device 16 may comprise two coaxially arranged, spaced-apart movable abutments 27 and 28 of different effective areas which are cooperably, though not positively, connected to each other so as to form a stack, as will be understood from subsequent description. The larger movable abutment 27 is subject at its under side, as viewed in the drawing, to pressure of fluid in a chamber 29 constantly open to the control reservoir 20 via a passage 30 and pipe 19; and said movable abutment is subject at the opposite side to pressure of fluid in a chamber 31 constantly open to the brake pipe 9 via a passage 32.

Movable abutment 27 is cooperably connected to the smaller movable abutment 28 through the medium of a coaxially arranged, cylindrical pusher stem 33 having sealing, slidably guided contact with the wall of an aligned bore through a casing partition 34 separating chamber 31 from an atmospheric chamber 35 at one side of movable abutment 28; said stem at its respective ends engaging the movable abutments 27, 28. At the opposite side of movable abutment 28 is a chamber 36 constantly open to a passage 37 which is normally open to the pipe 23 via the selector valve device 5. Coaxially connected to the movable abutment 28 is a cylindrical service valve 38 having sealing, slidably guided contact with the wall of an aligned bore 39 open at one end to chamber 36 and open at the opposite end to a generally annular chamber 40 that surrounds a reduced diameter portion of said valve and is constantly open to a branch of passage 37. This reduced diameter portion has a central bore-like opening 41 that is constantly open via suitable radial ports to an elongated annular cavity 42 formed in the exterior of valve 38 and constantly open to the atmosphere by way of a brake cylinder release passage 43 containing a brake cylinder release choke 44.

Arranged coaxially with valve 38 is a preferably disc-shaped brake cylinder supply valve 45 which controls communication between chamber 40 and a chamber 46 that is open via a passage 47, a brake cylinder application choke 48, and a passage 49 to supply reservoir pipe 21. A loading piston 50 subject to opposing fluid pressures in chamber 46 and in a chamber 51 is urged, by a helical bias spring 52 in chamber 51, into abutting contact with the supply valve 45 for normally seating the latter against an annular valve seat rib encircling the inner end of bore 39.

The charging valve device 17 may comprise a movable abutment 53 subject at one side to pressure of fluid in a chamber 54 open to a branch of passage 37 and subject at the opposite side to pressure of a helical bias spring 55 in an atmospheric chamber 56. Coaxially connected to the movable abutment 53 at its spring side is a cylindrical charging valve 57 slidably mounted in a bore 58, the inner end of which is open to atmospheric chamber 56 by way of a suitable internal passageway in said valve.

The quick release valve device 4 preferably comprises a movable abutment 59 having at one side a chamber 60 constantly open to a branch of brake pipe passage 32 and at the opposite side a chamber 61 constantly open to a passage 62 leading to the selector valve device 5. Coaxially connected to the movable abutment 59 is a cylindrical quick release valve 63 reciprocably mounted in a bore open to chamber 61 and having an internal passageway 64 via which the inner end of said bore is exposed to pressure of fluid in the chamber 61. When brake pipe pressure as noted in chamber 60 is substantially equal to the opposing pressure in chamber 61, a helical bias spring 65 in chamber 60 will bias the movable abutment 59 and thereby the valve 63 to a normal position, in which it is shown, and in which an elongated annular cavity 66 formed in said valve intermediate its ends is exposed solely to an atmospheric vent choke 67.

The selector valve device 5 may comprise a movable abutment 68 subject at one side to pressure of a helical bias spring 69 in a chamber 70 which may be opened to atmosphere but is preferably, according to a feature of the invention, connected to the pipe 10, as shown; and said movable abutment is subject at the opposite side to pressure of fluid in a chamber 71. Coaxially connected to the movable abutment 68 is a cylindrical release selector valve 72 that is reciprocable within a bore that is open at one end to chamber 71 and at the opposite end is open to a passage 73 leading to pipe 25. Valve 72 has a suitable internal passageway 74 via which the chamber 71 is constantly open to the passage 73. Valve 72 has three spaced elongated annular cavities 75, 76, 77 formed intermediate its ends and sealingly isolated from each other by O-ring seals. When passage 73 and thus chamber 71 are vented, spring 69 will bias the movable abutment 68 and thereby the valve 72 to a normal position, in which they are shown, and in which cavity 75 connects a branch of passage 37 to a passage 78 leading to pipe 23; cavity 76 is in sole registry with a restricted vent passage 79; and cavity 77 is in sole registry with a branch of passage 62.

Pressure of fluid in pipe 25 and thus in chamber 71 is controlled by the double check valve 26, which may be of any suitable type operative to selectively connect the pipe 25 with the actuating pipe 13 or with a pipe 80 according to which of these pipes 13 or 80 is charged with fluid at the preponderant pressure, and thus operative to vent pipe 25 and chamber 71 when said pipes 13 and 80 are concurrently vented. Pressure of fluid in pipe 80 is controlled by a dynamic brake magnet valve device 81 comprising valve means (not shown) responsive to deenergization of a magnet 82 to connect pipe 80 with a vent pipe 83 and responsive to energization of said magnet to supply main reservoir air from a branch of pipe 14 to pipe 80. This magnet 82 is energized from such as a battery 82a or deenergized according to whether a handle of a dynamic brake controller 82b is moved to a cut-in or to a cut-out position, respectively; said controller being operable in its cut-in position to also close a dynamic braking circuit for causing a pair of traction motor fields 82c, 82d, and their respective armatures 82e, 82f to act as generators for dynamically braking the locomotive, in the manner more fully described in U.S. Patent 2,699,971, granted January 18, 1955, to G. M. Thomas.

A double check valve device 84 is provided for selectively connecting the independent application and release pipe 12 or the pipe 23 to a pipe 85 according to which of these pipes 12, 23 are charged with fluid at the preponderant pressure. Pipe 85 may lead directly to a brake cylinder 86 for controlling brake cylinder pressure directly or, if preferred, may lead to a control chamber of a conventional brake cylinder relay valve (not shown) which would operate in the well-known manner to provide in the brake cylinder fluid at a pressure equal to the pressure of fluid supplied to pipe 85.

Operation

Assume initially that the locomotive brake equipment embodying the invention is devoid of fluid under pressure. Under this condition, quick release valve 63 of device 4 will be biased by spring 65 to its normal position, in which passage 62 is cut off from vent choke 67; selector valve 72 of device 5 will be biased by spring 69 to its normal position, in which it is shown, and in which passage 62 is cut off from control reservoir passage 30 and passage 37 is connected via cavity 75 to passage 78 and pipe 23; the movable abutment stack 28, 27 and thereby service valve 38 of device 16 will be biased by a helical bias spring 87 in chamber 36 of device 16 to a brake release position, in which they are shown, and in which the passage 37 is connected via annular chamber 40, opening 41 and valve cavity 42 to brake cylinder release passage 43; and the charging valve 57 of device 17 will be operatively biased by spring 55 to its charging position, in which it is shown, and in which an elongated annular cavity 88 in said valve 57 connects a branch of control reservoir passage 30 to a passage 89 that is open via a control reservoir slow charge choke 90 to a branch of brake pipe passage 32.

To initially charge the equipment, the independent brake valve handle 11 is left in its release position, so pipes 12 and 13 will be maintained connected to atmosphere; the main reservoir 7 is charged with fluid under pressure in the well-known manner; and the handle 6 of brake valve device 1 may be moved to its slow release position for charging the brake pipe 9 with fluid at the preselected normal charge value of brake pipe pressure, in the manner heretofore described.

Some of the fluid under pressure thus supplied to the brake pipe 9 will flow via a branch of brake pipe passage 32 and a supply reservoir charging choke 91 to the underside of a preferably disc-shaped supply reservoir charging check valve 92 and unseat and flow past said check valve to passage 49 and thence to the supply reservoir 22 for charging the latter to substantial equality with brake pipe pressure. Some of such fluid will also flow via a branch of supply reservoir passage 49 and a control reservoir fast charge choke 93 to the underside of a preferably disc-shaped control reservoir fast charging check valve 94 and unseat said check valve against the resistance of a helical bias spring 95 and flow therepast to a branch of control reservoir passage 30 for charging the control reservoir 20 at a relatively fast rate until control reservoir pressure is a chosen value less than supply reservoir pressure, whereupon said check valve will be seated by spring 95. Meanwhile, fluid will flow via a branch of brake pipe passage 32, control reservoir slow charge choke 90, passage 89, and cavity 88 of valve 57 in charging position to control reservoir passage 30 for charging control reservoir 20 to equality with brake pipe pressure at a relatively slow rate, after seating of check valve 94, to minimize the possibility of overcharging the control reservoir.

Meanwhile, fluid under pressure will flow at a substantially unrestricted rate via branches of brake pipe passage 32 to chamber 60 of device 4 and also to chamber 31 of service valve device 16. Thus, service valve 38 will be maintained in its brake release position, in which it is shown, because brake pipe air will be supplied to chamber 31 at a faster rate than control reservoir air is being supplied to chamber 29.

To effect an automatic application of brakes on the locomotive in unison with those on the connected cars, the brake valve handle 6 is moved into the application zone an extent corresponding to the degree of application desired for causing a corresponding desired reduction in brake pipe pressure in the manner heretofore described. As a result of this reduction in brake pipe pressure in chamber 31, preponderant control reservoir pressure in chamber 29 will shift the movable abutment stack 27, 28 and thereby carry the service valve 38 to a brake application position, in which the free end of said valve sealingly abuts brake cylinder supply valve 45 and unseats the latter against pressure of spring 52 for sealing off passage 37 from brake cylinder release passage 43 and causing supply reservoir air to flow via passage 49, brake cylinder application choke 48, passage 47 and past unseated valve 45 and via chamber 40 to passage 37, whence it will flow via selector valve cavity 75, pipe 23, double check valve 84 and pipe 85 to the brake cylinder 86 for applying brakes on the locomotive to the same degree as will be effected on the connected cars by their respective brake controlling valve devices (not shown).

It should be noted that if it is desired to interpose in pipe 85 a brake cylinder relay valve (not shown), as above suggested, which will operate in the usual manner to provide in the brake cylinder 86 fluid at whatever pressure is provided in pipe 85, then a displacement volume reservoir (not shown) should be connected to a branch of pipe 23 for simulating the displacement effect of the brake cylinder piston in moving to its brake applying position.

Meanwhile, when pressure of fluid in chamber 54 of device 17 exceeds a preselected low value, such as about 2 p.s.i., movable abutment 53 will be shifted against resistance of spring 55 for carrying charging valve 57 to a cut-off position, in which control reservoir passage 30 is cut off from passage 89 and hence from the brake pipe 9, for bottling up fluid in the control reservoir 20 at substantially the normal charge value of brake pipe pressure.

The effective area of movable abutment 27 is preferably about 2.9 times that of movable abutment 28 so that for each 1 p.s.i. of differential between control reservoir pressure and brake pipe pressure in excess of the combined bias effect of springs 87, 52, brake cylinder pressure will be varied 2.9 p.s.i. Thus, when brake cylinder pressure as noted in chamber 36 has increased to a degree corresponding to the degree of reduction in brake pipe pressure, the stack 27, 28 will shift service valve 38 to a lap position, in which it seals off passage 37 from the exhaust opening 41 but permits seating of the valve 45 by spring 52 for thereby bottling up fluid in the brake cylinder 86 at the desired pressure. The function of loading piston 50 is to make the brake cylinder supply valve 45 a balanced valve under the conditions, and in the manner, fully described in the copending application of G. T. McClure, U.S. Serial No. 607,340, filed August 31, 1956, but not here described in detail because this feature is not pertinent to the present invention.

To effect a graduated release of an automatic application of brakes on the locomotive and connected cars, the brake valve handle 6 is moved back toward slow release position an extent corresponding to the degree of release desired for causing the brake pipe 9 to be recharged to a corresponding degree. The service stack 27, 28 will thereupon shift service valve 38 to brake release position for releasing air from the brake cylinder 86 by reverse flow through double check valve 84, valve cavity 75 to passage 37 which will then be connected to release passage 43. If handle 6 was moved back toward but not to slow release position, the service valve 38 will be returned to lap position when brake cylinder pressure has been reduced to a value corresponding to the degree of increase in brake pipe pressure; whereas if handle 6 is moved to slow release position, the brake cylinder will be completely vented and service valve 38 will remain in its brake release position.

To effect a quick complete release of brakes on both the locomotive and connected cars, brake valve handle 6 is moved to its fast or full release position for rapidly charging the brake pipe and causing the service valve 38 to be moved to and remain in brake release position for completely venting the brake cylinder 86. It should be noted that while this brake valve device 1 is capable of effecting a fast direct release of brakes on the locomotive and cars when the locomotive and cars are equipped with brake controlling valves of the type comprising means controlled by rate of recharging of the brake pipe, it is intended that in the equipment herein disclosed the brake valve device 1 in fast or full release position merely effects a complete release of brakes, with the rate of such release being controlled according to the rate at which brake cylinder pressure may be released via brake cylinder release choke 44. However, since the brake pipe 9 is recharged more rapidly in full release position than in slow release position, complete release of brakes on the cars toward the rear of the train will be more promptly initiated.

To effect an application of locomotive brakes independently of those on the connected cars, the independent brake valve handle 11 is moved horizontally into the aforementioned application zone for providing in the independent application and release pipe 12 fluid at a pressure corresponding to the degree of brake application desired, which pressure must be in excess of any pressure then existing in pipe 23 so that double check valve 84 will operate to control locomotive brakes according to the pressure in pipe 12 rather than in pipe 23. In other words, locomotive brakes can thus be applied independently of those on the cars to any desired degree, if the car brakes are released; whereas if locomotive and car brakes are being concurrently applied under control of the brake valve device 1, then locomotive brakes can thus be independently applied to any degree greater than the existing degree of application of the car brakes.

According to features of the invention, if the independent brake valve handle 11 is depressed, main reservoir air will be supplied to the actuating pipe 13 and flow past double check valve 26 to pipe 25; or if the dynamic brakes are cut into operation, magnet 82 of magnet valve device 81 will automatically be energized and cause main reservoir air to be supplied to pipe 80 and flow past double check valve 26 to pipe 25. When pipe 25 is charged, under either of these conditions, main reservoir air will flow via passage 73 to chamber 71 of device 5 for causing movable abutment 68 to move against resistance of spring 69 and thereby shift the selector valve 72 to a release position, in which passage 37 is cut off from pipe 23, pipe 23 is opened to the restricted vent passage 79 via valve cavity 76, and control reservoir passage 30 is connected via valve cavity 77 to passage 62 for causing control reservoir pressure to equalize into chamber 61 of device 4. If, as will usually be the case, control reservoir pressure in chamber 61 at this time exceeds the value of brake pipe pressure in chamber 60 (because an automatic brake application will generally then be in effect on the locomotive and cars), movable abutment 59 will move against resistance of the light bias spring 65 and shift the quick release valve 63 to a quick release position, in which a branch of passage 62 is connected to the atmospheric vent choke 67. Hence, control reservoir pressure will blow down at the rate controlled by choke 67 until it is reduced to substantially the existing value of brake pipe pressure, whereupon valve 63 will be returned to its normal position by spring 65 for terminating this venting of control reservoir pressure.

Meanwhile, this reduction in control reservoir pressure will be noted in chamber 29 of device 16 and cause service valve 38 to be shifted to its brake release position in which passage 37 is connected to release passage 43; but this will not influence brake cylinder pressure because passage 37 is then disconnected from pipe 23 by the selector valve 72. Since pipe 23 is vented via cavity 76 of selector valve 72 in release position and restricted vent passage 79, double check valve 84 will operate to release brake cylinder pressure to the value of pressure then existing in the independent application and release pipe 12. Thus, if independent brake valve handle 11 is being depressed in normal position, pipe 12 will be vented and hence the brake cylinder 86 will be completely vented; whereas if said handle is being depressed while in the application zone, then brake cylinder pressure will be released to a degree corresponding to the pressure in pipe 12 as determined by the horizontal arcuate position of said handle in said zone.

It will thus be noted that as long as independent brake valve handle 11 is depressed or dynamic brakes are cut in, the selector valve 72 will be maintained in its release position for locking out control of the locomotive brakes from the brake valve device 1 and maintaining the control reservoir 20 connected to the passage 62. Hence, if a brake pipe pressure reduction is made by operation of the brake valve device 1 for effecting an increased degree of brake application on the connected cars, while dynamic brakes are cut in on the locomotive, the quick release valve device 4 will desirably operate to effect a corresponding reduction in control reservoir pressure, so that when the dynamic brakes are released, locomotive brakes will not be automatically reapplied to a degree corresponding to the degree of automatic brake application then in effect on the cars, in accordance with preferred railroading practice for equipments of this type, but locomotive brakes may, if desired, be smoothly applied to any chosen degree by moving the independent brake valve handle 11 into the application zone and thereby providing fluid at a selectable pressure in the independent application and release pipe 12.

Similarly, if a brake pipe pressure reduction is made by operation of the brake valve device 1 for effecting an increased degree of brake application on the cars while independent brake valve handle 11 is depressed, the quick release valve device 4 will desirably operate to effect a corresponding reduction in control reservoir pressure so that, when said handle is permitted to return to its elevated position, locomotive brakes will not be automatically reapplied to a degree corresponding to the degree of automatic brake application then in effect on the cars, in accordance with preferred railroading practive for equipments of this type; but locomotive brakes may, if desired, be smoothly applied by charging the independent application and release pipe 12.

According to another feature of the invention, the chamber 70 of device 5 is preferably connected to the pipe 10 as a precautionary measure. As previously stated, pipe 10 is normally vented, and is charged with the main reservoir air only in the fast or full release position of the brake valve handle 6. By thus permitting chamber 70 to be charged, means are provided for assuring that, in event of breakage of the spring 69 or excessive friction of the O-ring seals carried by the selector valve 72, the latter can be positively moved to its normal position and thus assure that locomotive brakes may be controlled in unison with those on the cars by connection of passage 37 to pipe 23. If the valve 72 were to stick in its release position, control reservoir pressure will always blow down with brake pipe pressure due to above-discussed operation of the quick release valve 63 and thus prevent the service valve 38 from moving to brake application position to apply the automatic brakes on the locomotive in unison with those on the cars. Under this condition, the engineer would have to rely on his dynamic brakes or independent brake valve device 2 to brake the locomotive. However, as above explained, this feature is merely precautionary, and if preferred it may be eliminated and the chamber 70 opened to atmosphere, in which case the spring 69 will be relied upon to prevent sticking of the selector valve 72 in release position after pipe 25 is vented.

Having now described the invention, what I claim as new and desire to secure by Letters Patent, is:

1. In a locomotive brake equipment of the type wherein locomotive brakes are normally controlled in unison with those on the connected cars of a train according to the degree of reduction and restoration, respectively, in pressure of fluid in a brake pipe relative to pressure of fluid normally bottled up in a control reservoir at the normal charge value of brake pipe pressure, the combination of a normally vented pipe that is chargeable with fluid under pressure, valve means subject opposingly to brake pipe pressure and pressure of fluid in a chamber and operative when pressure in said chamber exceeds brake pipe pressure to release pressure in said chamber to substantially the existing value of brake pipe pressure, and other valve means responsive to charging of said normally vented pipe to connect the control reservoir to said chamber and also release locomotive brakes independently of those on the cars, whereby upon subsequent venting of said normally vented pipe, brakes on the locomotive will not reapply to a degree corresponding to the degree of application which is then in effect on the cars.

2. A locomotive brake equipment for controlling brakes on a locomotive and on the connected cars of a train, said equipment comprising, in combination, a normally charged brake pipe, a control reservoir normally containing fluid at the normal charge value of brake pipe pressure, a service valve device for normally causing application and release of locomotive brakes in unison with the brakes on the connected cars according to the extent of reduction and restoration, respectively, of brake pipe pressure relative to control reservoir pressure, a normally vented pipe that is chargeable with fluid under pressure, valve means normally in one position for establishing a fluid pressure communication whereby locomotive brakes will be controlled by said service valve device and operative to another position responsively to charging of said normally vented pipe for disestablishing said communication so as to cut off control of locomotive brakes from said service valve device and establishing another communication whereby locomotive brakes will be released independently of those on the connected cars, and other means responsive to operation of said valve means to its said other position to effect a reduction in control reservoir pressure to the existing value of brake pipe pressure, such that upon return of said valve means to its said one position responsively to venting of said normally vented pipe said service valve device will be conditioned to maintain locomotive brakes released irrespective of the extent to which brake pipe pressure may then be below its normal charge value.

3. A locomotive brake equipment as claimed in claim 2, wherein the locomotive having such equipment is equipped with dynamic brakes, and including means operative automatically according to whether dynamic brakes on the locomotive are cut into operation or cut out of operation to supply fluid under pressure to or release fluid under pressure from said normally vented pipe, whereby pneumatic brakes on the locomotive will be automatically released while dynamic brakes are cut in.

4. A locomotive brake equipment as claimed in claim 2, including independent brake valve means normally in one position for venting said normally vented pipe and operative to another position for supplying fluid under pressure to said normally vented pipe for causing a release of brakes on the locomotive independently of those on the cars.

5. A locomotive brake equipment as claimed in claim 2, wherein the locomotive having such equipment is equipped with dynamic brakes, and including a second pipe, a third pipe, double check valve means operative to connect the normally vented pipe to said second pipe or said third pipe according to which of the latter two pipes is charged with fluid at the preponderant pressure, dynamic brake magnet valve means operative according to whether dynamic brakes on the locomotive are cut in or cut out of operation to supply fluid under pressure to or vent said second pipe, and independent brake valve means normally venting said third pipe and operable to supply fluid under pressure to said third pipe, whereby brakes on the locomotive will be released independently of those on the connected cars either upon cut-in of dynamic brakes or charging of said third pipe by operation of said independent brake valve means.

6. A locomotive brake equipment for controlling brakes on a locomotive and connected cars of a train, said equipment comprising, in combination, a normally charged brake pipe, a control reservoir normally containing fluid at the normal charge value of brake pipe pressure, a passage, service valve means operative to provide in said passage fluid at a pressure corresponding substantially to the magnitude of fluid pressure differential between brake pipe pressure and control reservoir pressure, a normally vented pipe that is chargeable with fluid under pressure, valve means subject opposingly to brake pipe pressure and pressure of fluid in a chamber and operative to release fluid under pressure from said chamber to substantially the existing value of brake pipe pressure when chamber pressure exceeds brake pipe pressure, a brake controlling communication to which fluid under pressure is supplied for causing an application of locomotive brakes and from which fluid under pressure is released for causing a release of locomotive brakes, and other valve means normally biased to one position for connecting said passage to said brake controlling communication and cutting off said control reservoir from said chamber and operative to another position responsively to charging of said normally vented pipe to disconnect said passage from said brake controlling communication and open the latter to atmosphere and connect said control reservoir to said chamber, such that said service valve means will operate to vent said passage in consequence of the reduction in control reservoir pressure via said chamber so that when said passage is reconnected to said brake controlling communication upon return of said other valve means to its said one position, said brake controlling communication will be maintained vented irrespective of the extent to which brake pipe pressure may have been reduced below its normal charge value while said other valve means was in its said other position.

7. A locomotive brake equipment as claimed in claim 6, including operator-controlled brake valve means for controlling pressure of fluid in the brake pipe, another pipe, and a bias spring, said brake valve means having a position wherein it supplies fluid under pressure to said other pipe, and said other valve means being normally biased to its said one position by said bias spring but being also biasable to said one position by supply of fluid under pressure to said other pipe if said other valve means should tend to stick in its said other position due to such as breakage of said bias spring.

8. A locomotive brake equipment for controlling brakes on a locomotive and connected cars of a train, said equipment comprising, in combination, a normally charged brake pipe, a control reservoir normally containing fluid at the normal charge value of brake pipe pressure, one passage, service valve means operative to provide in said one passage fluid at a pressure corresponding substantially to the magnitude of fluid pressure differential between brake pipe pressure and control reservoir pressure, a normally vented pipe that is chargeable with fluid under pressure, valve means subject opposingly to pressure of fluid in a chamber and operative to release fluid under pressure from said chamber to substantially the existing value of brake pipe pressure when chamber pressure exceeds brake pipe pressure, another passage, a brake controlling communication to which fluid under pressure is supplied for causing an application of locomotive brakes and from which fluid under pressure is released for causing a release of locomotive brakes, other valve means normally connecting said one passage to said other passage and cutting off said control reservoir from said chamber and responsive to charging of said normally vented pipe to disconnect said one passage from said other passage and vent the latter and connect the control reservoir to said chamber, an independent application and release pipe, independent brake valve means operable to provide in said independent application and release pipe fluid at a selectable pressure corresponding to the degree of independent application or release of locomotive brakes desired, and means operative to connect to said brake controlling communication selectively to said independent application and release pipe or said other passage according to which of the latter contains fluid at the higher pressure.

9. A locomotive brake equipment as claimed in claim 8 for use on a locomotive having dynamic brakes, including an actuating pipe, another pipe, means operative to connect said normally vented pipe selectively to said actuating pipe or to said other pipe according to which of these latter two pipes contains fluid at the higher pressure, operator-controlled valve means for controlling charging and venting of said actuating pipe, and dynamic brake controlled valve means automatically operative to charge said other pipe or vent said other pipe according to whether dynamic brakes on the locomotive are respectively cut into operation or cut out of operation.

10. For use on a locomotive equipped with dynamic brakes and also equipped with a brake cylinder in which pressure of fluid is normally increased and decreased according to the degree of reduction and restoration, respectively, in pressure of fluid in a brake pipe relative to pressure of fluid normally bottled up in a control reservoir on the locomotive at substantially the normal charge value of brake pipe pressure, the combination of valve means operative in a release position to connect the control reservoir to a chamber and also establish a communication via which fluid under pressure will be released from the brake cylinder and operative in a normal position to disestablish such connection and such communication, quick release valve means controlled by brake pipe pressure opposing pressure of fluid in said chamber and operative whenever said chamber is connected to the control reservoir to effect a reduction in control reservoir pressure to substantially the existing value of brake pipe pressure, and means for causing the first-mentioned valve means to assume its said release position or said normal position according as dynamic brakes are cut in or are cut out of operation, respectively.

11. In a locomotive brake equipment of the type wherein pressure of fluid in a brake cylinder on the locomotive is normally increased and decreased according to the degree of reduction and restoration, respectively, in pressure of fluid in a brake pipe relative to pressure of fluid normally bottled up in a control reservoir on the locomotive at substantially the normal charge value of brake pipe pressure, the combination of valve means operative in a release position to connect the control reservoir to a chamber and also establish a communication via which fluid under pressure will be released from the brake cylinder and operative in a normal position to disestablish such connection and communication, quick release valve means controlled by brake pipe pressure opposing pressure of fluid in said chamber and operative whenever said chamber is connected to the control reservoir to effect a reduction in control reservoir pressure to substantially the existing value of brake pipe pressure, and means under control of an operator for controlling positioning of the first-mentioned valve means.

References Cited in the file of this patent
UNITED STATES PATENTS

| | | |
|---|---|---|
| 2,038,174 | Hewitt | Apr. 21, 1936 |
| 2,699,971 | Thomas | Jan. 18, 1955 |